June 18, 1957 C. O. SCHMIDT, JR 2,796,102
ROTARY MEAT CUTTER AND SHAFT ASSEMBLY
Filed May 24, 1954 2 Sheets-Sheet 1
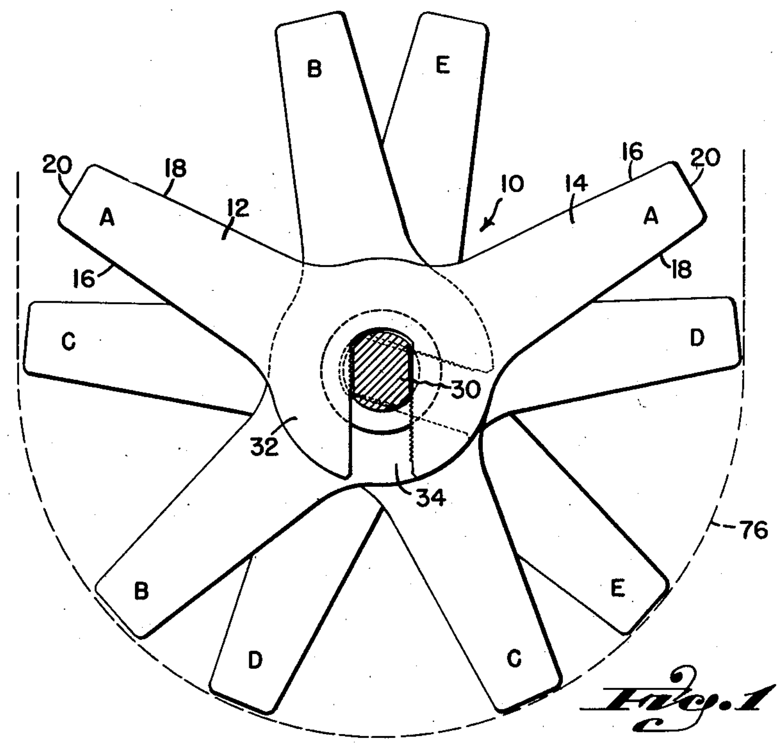
Fig. 1
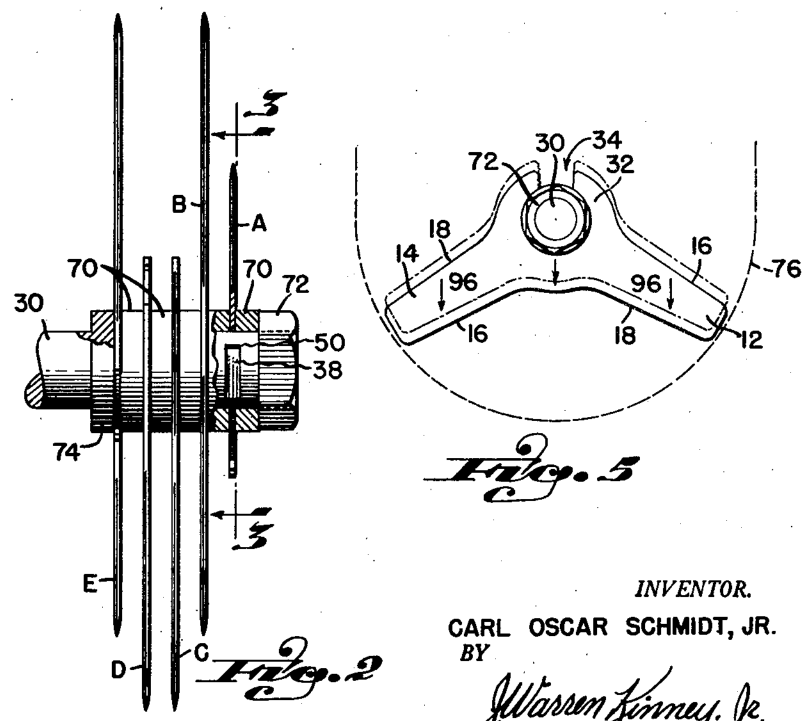
Fig. 2
Fig. 5
INVENTOR.
CARL OSCAR SCHMIDT, JR.
BY
J. Warren Kinney, Jr.
ATTORNEY

ROTARY MEAT CUTTER AND SHAFT ASSEMBLY

Filed May 24, 1954 2 Sheets-Sheet 2

INVENTOR.
CARL OSCAR SCHMIDT, JR.
BY
J. Warren Kinney, Jr.
ATTORNEY

United States Patent Office 2,796,102 Patented June 18, 1957

2,796,102

ROTARY MEAT CUTTER AND SHAFT ASSEMBLY

Carl Oscar Schmidt, Jr., Wyoming, Ohio, assignor to The Cincinnati Butchers' Supply Company, Cincinnati, Ohio, a corporation of Ohio Application May 24, 1954, Serial No. 431,830

7 Claims. (Cl. 146—106)

This invention relates to cutter knives, and more particularly to knives of the type for use in commercial meat cutting, chopping and mixing machines.

An object of the invention is to provide a cutter knife for meat cutting machines, wherein the knife includes means for enabling it to be quickly and accurately adjusted relative to the axis of rotation of the knife-carrying shaft on which it is mounted.

Another object of the invention is to provide a knife for a meat cutting machine wherein the blade carrying shaft of the meat cutting machine is provided with a series of laterally spaced flats, adjacent ones of which are angularly disposed, each of said flats including an overhanging projection or tooth in the leading edge for cooperative engagement with serrations provided in the side edges of the shaft-receptive slot in the hub or mounting portion of the cutter knives mounted on the shaft.

A further object of the invention is to provide a cutter knife which includes integral means engageable with complementary means on the shaft for maintaining the knives in proper axial alignment during those periods of time when the individual knives of the knife assembly are in the process of being adjusted relative to the shaft.

Another object of the invention is to provide a cutter knife and shaft assembly having the hereinabove described characteristics and wherein the structural details and physical relationship of the knives and shaft are such as to positively preclude accidental or unintentional disengagement of a cuter knife from the shaft incident to operation of the machine.

These and other objects are attained by the means described herein and as disclosed in the accompanying drawings, in which:

Fig. 1 is an end view of a cutter shaft of a typical meat cutting machine provided with a plurality of knives embodying the teachings of the present invention.

Fig. 2 is a side view of the assembly of Fig. 1.

Fig. 5 is an end view illustrating only one knife associated with a blade carrying shaft illustrating the knife in fully advanced and retracted positions with reference to the shaft.

Figure 3:
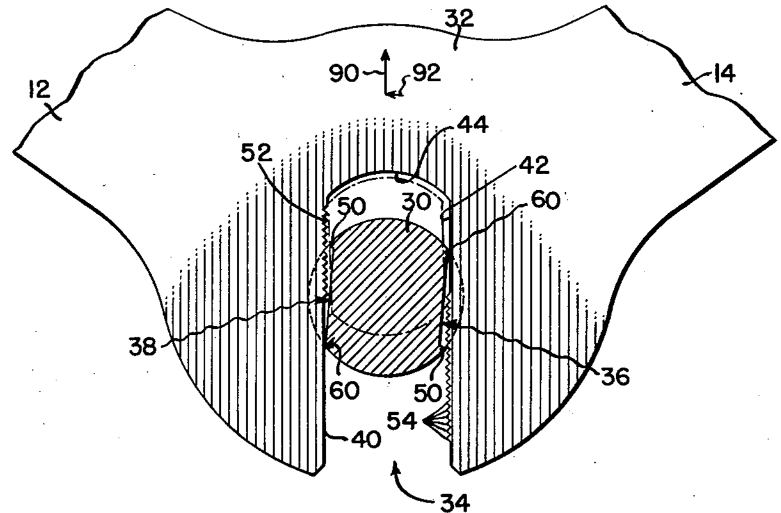
Fig. 3 is a sectional view taken on line 3—3 of Fig. 2.

With reference now to Figs. 1, 3 and 5, the numeral 10 denotes generally a cutter knife which comprises a pair of elongated blade portions 12 and 14 the opposite side edges 16 and 18, and the outer free end 20 of which are sharpened to provide keen cutting edges.

In the discussion which is to follow, it will be assumed that shaft 30, to which the blades are secured, rotates in a counterclockwise direction, and that edges 16 of the blades are leading edges and 18 trailing edges in the particular assembly illustrated.

The shank portion of the blades terminate in an integral hub, mounting member or friction plate 32 having an openended slot 34 provided therein, wherein the axis of the slot bisects the angle included between the blades.

In the preferred embodiment of the invention the hub or mounting portion 32 is provided with flat and unobstructed side faces and slots 34 are defined by a pair of laterally spaced faces 40 and 42 interconnected at their innermost ends by end wall 44.

Figure 4:
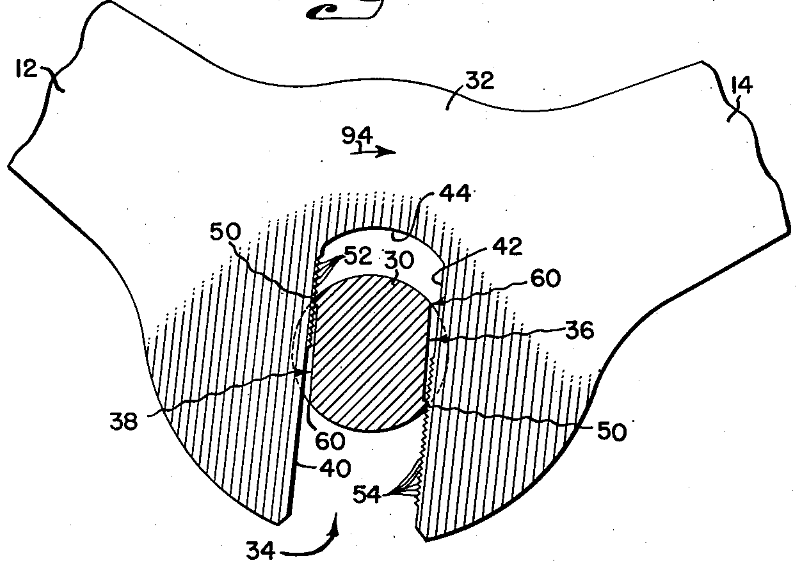
Fig. 4 is a view similar to Fig. 3 but wherein the knife has been located or cocked relative to the mounting shaft incident to adjustment thereon.

With particular reference now to Figs. 3 and 4, it will be noted that shaft 30 is provided with a plurality of sets or pairs of flats, one pair of flats being provided for each knife. The axis of each pair of flats is disposed at an angle with reference to adjacent laterally spaced flats. As disclosed in Figs. 1 and 2, five knives are mounted to shaft 30 so that the adjacent flats will be disposed 72 degrees apart. The numerals 36 and 38 denoted generally one set or pair of flats which are disposed in substantial parallelism. The leading end of each of the flats 36 and 38 terminate in overhanging or outwardly projecting projections, abutments or teeth 50, it being noted that a portion of each of said teeth comprises an extension of the leading periphery of the shaft.

The adjacent edges of faces 40 and 42 of slot 34 are provided with serrated portions 52 and 54, respectively, which are adapted to mesh with or engage teeth 50 of a corresponding pair of flats, for thereby securing a cutter knife to and in predetermined relationship with shaft 30.

As best illustrated in Figs. 3 and 4, the lateral spacing between flats 36 and 38 is of a dimension less than the lateral spacing between adjacent portions of serrated elements 52 and 54 of slot 34. It will likewise be noted that the relationship of teeth 50 with respect to the spacing between flats 36 and 38 is such as to permit the slot of a blade to be moved in an axial direction onto a pair of flats wherein the respective trailing edges 60 of flats 36 and 38 are adapted to slidably engage the plain, smooth, or non-serrated portions of flats 40 and 42 and wherein the teeth will just clear the serrated portions of the slot faces.

It will be noted that face 40 may be considered as the trailing face and face 42 as the leading face of the slot in those instances wherein shaft 30 is rotated in a counter-clockwise direction. Serrations 52 of trailing face 40 is disposed remote from the outer or open end of slot 34, whereas serrations 54 in the leading face are disposed adjacent the outer edge of the slot and remote from inner wall 44; it being further noted that the serrated portions of one wall are opposite non-serrated, smooth or flat portions of the other wall.

When the relationship of the slot and flats of the shaft are in the relative position illustrated in Fig. 3, the blade may be easily slid in the direction indicated by headed arrow 90 onto the flats of the shaft incident to relative movement of the hub in a counter-clockwise direction denoted by the headed arrow 92 for disposing the trailing edge 60 of flats 36 and 38 in contact with smooth portions of faces 40 and 42 and for disengaging teeth 50 from serrated portions 52 and 54. After the desired adjustment has been effected, the knife may then be turned relative to the shaft in a clockwise direction denoted by headed arrow 94 of Fig. 4 for inserting teeth 50 of the shaft within serrations 52 and 54 for thereby securely though releasably axially locating the blade relative to the shaft.

With particular reference now to Fig. 2, it will be noted that shaft 30 has been provided with five different knives the individual blades of which are denoted generally by the letters A, B, C, D, and E, respectively, wherein the slot of each of said knives is mounted on a particular set or pair of flats for providing the composite cutter arrangement illustrated in Fig. 1.

Spacer collars 70 are provided between the adjacent faces of the hub portions 32 of adjacent blades in order that each of the blades may be fixedly, though releasably, anchored, in adjusted position, relative to shaft 30 incident to tightening of nut 72, the effect of which is to compress hub portions 32 of the blades and their spacer collars to the left, against abutment 74 of shaft 30.

From the foregoing it will be noted that I have thus provided simple yet highly effective means for enabling an operator to effect precise adjustment of the individual knives of a meat cutting machine relative to the axis of shaft 30 and the inner periphery of a bowl 76, as clearly illustrated in Fig. 5. It will likewise be noted that in addition to providing means for maintaining the knives in proper relationship with respect to shaft 30 and bowl 76, the knives are securely locked onto the shaft against accidental or unintentional displacement therefrom, it being noted that teeth 50 are normally urged toward and into seating relationship with the serrated portions 52 and 54 of the various slots, incident to clockwise rotation of the shaft.

As clearly illustrated in Figs. 3 and 4, teeth 50 comprise a pair of diametrically opposed, circumferential abutments integral with shaft 30 and at the leading end of parallel flats 36 and 38 in opposite sides of the shaft.

It should be understood that various changes and modifications in the structural details of the device may be made, within the scope of the appended claims, without departing from the spirit of the invention.

What is claimed is:

1. In a meat cutting machine, the combination of a knife-carrying shaft having a pair of spaced flats therein each of which includes a leading end which terminates in a circumferential abutment, and a cutter knife on the shaft having a mounting portion provided with a slot having a major width slightly greater than and adapting it to receive the shaft between said flats, said slot including a pair of side edges provided with serrations adapted to receive said circumferential abutments.

2. In a meat cutting machine, the combination of a shaft having a pair of parallel flats in opposite sides thereof each of which includes a leading end which terminates in circumferential abutments, and a cutting knife on the shaft having a hub provided with a slot having a major width greater than and receiving the shaft between said flats, said slot including a pair of side edges each having smooth and serrated portions wherein the smooth portion of one edge is opposite the serrated portion of the other edge, said serrations adapted to receive the circumferential abutments of the shaft.

3. In a meat cutting machine, the combination of a shaft having a pair of parallel flats in opposite sides thereof each of which includes a leading end which terminates in a pair of diametrically opposed circumferential abutments, and a cutter knife on the shaft having a hub provided with a radially extending slot open at its outer end and having a major width greater than and receiving the shaft between said flats, said slot including a leading side edge and a trailing side edge each having smooth and serrated portions, the smooth portion of the leading edge located remote from its outer end with the serrated portion adjacent said end, the smooth portion of the trailing edge located adjacent its outer end with the serrated portion remote therefrom, said serrations adapted to receive the circumferential abutments of the shaft.

4. In a meat cutting machine, the combination of a knife-carrying shaft having a plurality of sets of flats disposed in angular relationship, wherein each set of flats is defined by a pair of parallel faces in opposite sides of the shaft and each face includes a leading and a trailing end, the leading end of each of said faces terminating in an overhanging circumferential abutment, and a cutter knife on the shaft having a mounting portion and elongated blades extending therefrom, said mounting portion having flat and unobstructed side faces and being provided with a slot and axis of which bisects the axes of the blades, said slot having a major width greater than the shaft between the sets of flats and including a pair of parallel, spaced edges provided with serrations adapted to receive the circumferential abutments of the shaft for precluding axial movement of the slot relative to the shaft.

5. A knife for a meat cutting machine of the type which includes a shaft having a pair of parallel flats on opposite sides of the shaft wherein each flat includes a leading end which terminates in an overhanging circumferential abutment, said knife being adapted to be mounted on said shaft and including a mounting portion and elongate blade portions extending therefrom, said mounting portion having flat and unobstructed side faces and being formed with a slot open at its outer end, the axis of which bisects the axes of the blade portions, said slot having a major width greater than the width of and adapted to receive the blade-carrying shaft of the meat cutting machine between the flats thereof, said slot including a pair of laterally spaced faces provided with serrated portions selectively engageable with the circumferential abutments of the shaft.

6. In a meat cutting machine, the combination of a knife-carrying shaft having a pair of parallel, spaced flats on opposite sides thereof each of which includes a leading end, circumferential abutments provided at the intersection of the leading end of the flats with the circumference of the shaft, and a cutter knife on the shaft having a mounting portion and elongated blades extending therefrom, said mounting portion provided with a radial slot the axis of which bisects the axes of the blades, said slot having a major width greater than the shaft between the spaced flats and including a pair of laterally spaced side edges provided with serrations adapted to selectively receive the said abutments on the shaft for precluding endwise radial movement of the knife relative to the shaft.

7. In a meat cutting machine, the combination of a shaft having a pair of parallel flats in opposite sides thereof each of which includes leading ends which terminate in a pair of diametrically opposed circumferential abutments, a cutter knife on the shaft having a hub provided with a radially extending slot open at its outer end and having a major width greater than and receiving the shaft between said flats, said slot including a leading side edge and a trailing side edge each having both smooth and serrated portions, wherein the smooth portion of one side edge is opposite the serrated portion of the other side edge, and wherein the smooth portion of the leading edge is remote from its outer end with a serrated portion adjacent said end, and the smooth portion of the trailing edge is adjacent its outer end with the serrated portion remote therefrom, said serrations selectively movable into and out of engagement with the circumferential abutments for locking the knife against radial movement relative to the shaft and for facilitating such radial movement, respectively.

References Cited in the file of this patent

UNITED STATES PATENTS

| | | |
|---|---|---|
| 588,828 | Hinrichs | Aug. 24, 1897 |
| 904,819 | Troeller | Nov. 24, 1908 |
| 1,125,946 | Bovee | Jan. 26, 1915 |
| 2,165,460 | Desing | July 11, 1939 |